United States Patent
Cheung et al.

(10) Patent No.: US 10,252,791 B2
(45) Date of Patent: Apr. 9, 2019

(54) DEPLOYABLE ASSEMBLY FOR A PROPULSOR

(71) Applicant: General Electric Company, Schenectady, NY (US)

(72) Inventors: Lawrence Chih-hui Cheung, Niskayuna, NY (US); Nikolai N. Pastouchenko, Glenville, NY (US); Kishore Ramakrishnan, Rexford, NY (US)

(73) Assignee: General Electric Company, Schenectady, NY (US)

( * ) Notice: Subject to any disclaimer, the term of this patent is extended or adjusted under 35 U.S.C. 154(b) by 238 days.

(21) Appl. No.: 15/244,032

(22) Filed: Aug. 23, 2016

(65) Prior Publication Data

US 2018/0057150 A1 Mar. 1, 2018

(51) Int. Cl.

| | |
|---|---|
| *B64C 21/08* | (2006.01) |
| *B64C 21/06* | (2006.01) |
| *B64D 29/04* | (2006.01) |
| *B64C 1/16* | (2006.01) |
| *B64D 27/24* | (2006.01) |
| *B64D 33/02* | (2006.01) |
| *B64D 33/04* | (2006.01) |
| *B64D 27/02* | (2006.01) |

(52) U.S. Cl.
CPC .............. *B64C 21/08* (2013.01); *B64C 1/16* (2013.01); *B64C 21/06* (2013.01); *B64D 27/24* (2013.01); *B64D 29/04* (2013.01); *B64D 33/02* (2013.01); *B64D 33/04* (2013.01); *B64D 2027/026* (2013.01); *B64D 2033/0226* (2013.01)

(58) Field of Classification Search
CPC .. B64C 21/08; B64C 7/00; B64C 7/02; B64D 29/04; B64D 27/14; B64D 27/20
See application file for complete search history.

(56) References Cited

U.S. PATENT DOCUMENTS

| | | | | | |
|---|---|---|---|---|---|
| 2,896,408 | A | * | 7/1959 | O'Donnell | ............... F02K 3/075 60/244 |
| 3,430,640 | A | * | 3/1969 | Lennard | .................. F02C 7/042 137/15.1 |

(Continued)

OTHER PUBLICATIONS

Charles et al., "Guidelines for Reducing Helicopter Parasite Drag", Journal of the American Helicopter Society, vol. 20, No. 1, pp. 31-40(10), Jan. 1, 1975.

(Continued)

*Primary Examiner* — Philip J Bonzell

(74) *Attorney, Agent, or Firm* — Peter A. Flynn

(57) ABSTRACT

An aircraft includes a fuselage extending between a forward end and an aft end. The aircraft additionally includes a propulsor mounted to the fuselage at the aft end of the fuselage, the propulsor including an outer nacelle and the outer nacelle defining an inlet. Additionally, the aircraft includes a deployable assembly attached to at least one of the fuselage or the outer nacelle, the deployable assembly movable between a stowed position and an engaged position. The deployable assembly alters an airflow towards the propulsor or into the propulsor through the inlet defined by the outer nacelle when in the engaged position to increase an efficiency of the aft fan and/or of the aircraft.

12 Claims, 12 Drawing Sheets

(56) References Cited

U.S. PATENT DOCUMENTS

| | | | | |
|---|---|---|---|---|
| 3,702,121 | A | * | 11/1972 | Millman .................. F02C 7/04 |
| | | | | 137/15.1 |
| 4,307,743 | A | * | 12/1981 | Dunn ..................... B64D 33/02 |
| | | | | 137/15.1 |
| 4,474,344 | A | | 10/1984 | Bennett |
| 4,767,083 | A | * | 8/1988 | Koenig ................. B64C 21/025 |
| | | | | 244/12.3 |
| 4,919,364 | A | * | 4/1990 | John ...................... B64D 27/20 |
| | | | | 244/53 B |
| 6,390,414 | B1 | * | 5/2002 | Medvedev ............. B64D 33/02 |
| | | | | 244/53 B |
| 7,090,165 | B2 | | 8/2006 | Jones et al. |
| 8,127,531 | B2 | | 3/2012 | Parham |
| 8,181,905 | B2 | | 5/2012 | McDonough et al. |
| 8,205,430 | B2 | | 6/2012 | Jain |
| 8,434,309 | B2 | | 5/2013 | Levasseur |
| 2010/0095650 | A1 | | 4/2010 | Schafer |
| 2016/0332741 | A1 | * | 11/2016 | Moxon .................. B64C 15/00 |

OTHER PUBLICATIONS

Andres Garzon et al., "Use of a Translating Cowl on a SSBJ for Improved Takeoff Performance", 45th AIAA Aerospace Sciences Meeting and Exhibit, Jan. 8-11, 2007, Reno, Nevada.

\* cited by examiner

DEPLOYABLE ASSEMBLY FOR A PROPULSOR

FIELD OF THE INVENTION

The present subject matter relates generally to deployable assembly for an aft fan, and an aircraft including the same.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft including the turbofan jet engines, also has an effect on the net propulsive thrust of the aircraft. A total amount of drag on the aircraft, including skin friction and form drag, is generally proportional to a difference between a freestream velocity of air approaching the aircraft and an average velocity of a wake downstream from the aircraft that is produced due to the drag on the aircraft.

Accordingly, a propulsor for an aircraft that energizes the wake and improves propulsion efficiency would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure an aircraft is provided. The aircraft includes a fuselage extending between a forward end and an aft end, and a propulsor mounted to the fuselage at the aft end of the fuselage. The propulsor includes an outer nacelle, the outer nacelle defining an inlet. The aircraft also includes a deployable assembly attached to at least one of the fuselage or the outer nacelle and moveable between a stowed position and an engaged position, the deployable assembly altering an airflow towards the propulsor or into the propulsor through the inlet defined by the outer nacelle when in the engaged position.

In another exemplary embodiment of the present disclosure an aft engine is provided for an aircraft. The aircraft includes a fuselage. The aft engine defines an axial centerline and includes an outer nacelle extending around the axial centerline and defining an inlet. The aft engine additionally includes a deployable assembly attached to the outer nacelle and movable between a stowed position and an engaged position, the deployable assembly altering an airflow towards the aft engine or into the aft engine through the inlet defined by the outer nacelle when in the engaged position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
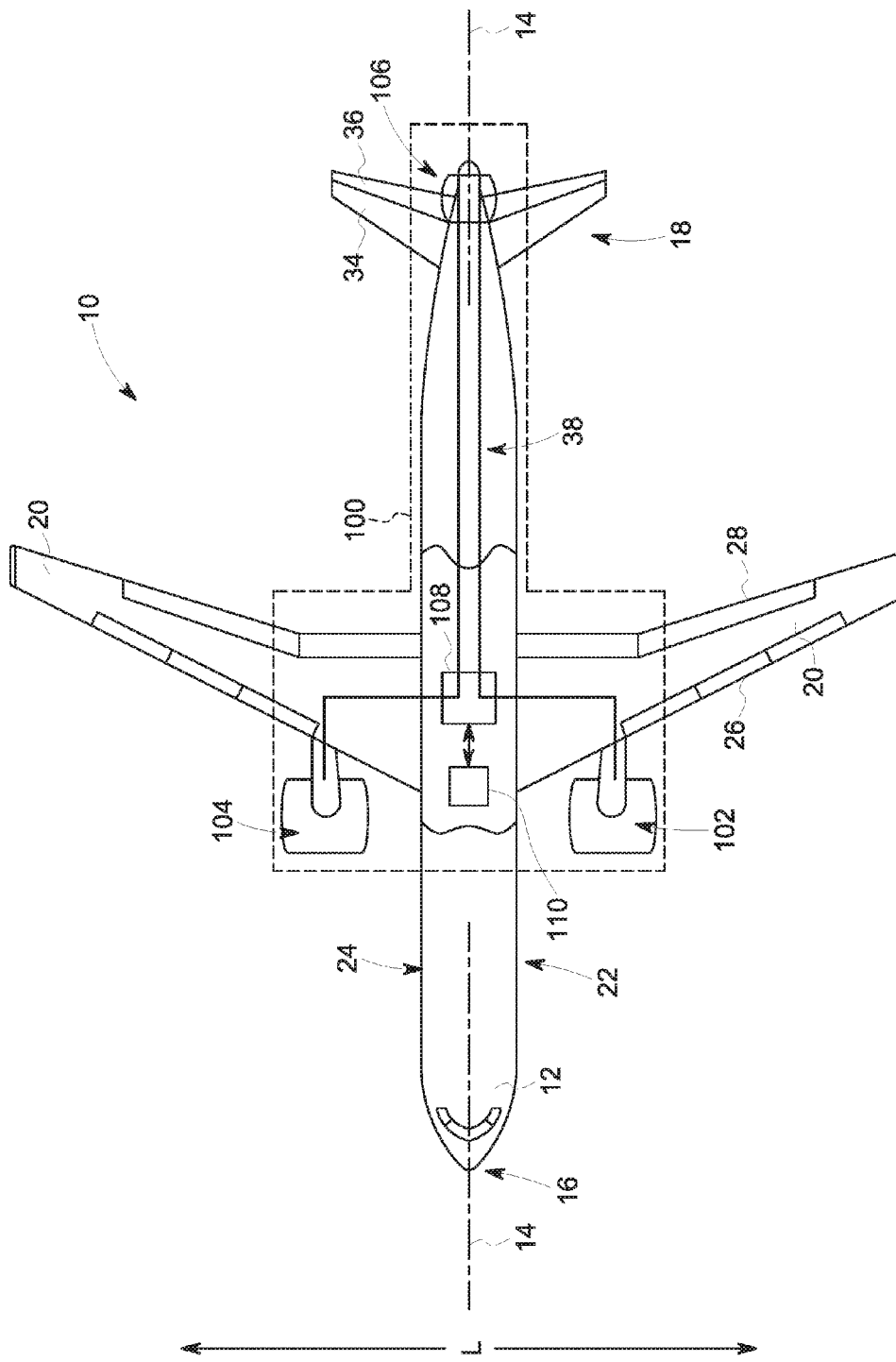
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "forward" and "aft" refer to the relative positions of a component based on an actual or anticipated direction of travel. For example, "forward" may refer to a front of an aircraft based on an anticipated direction of travel of the aircraft, and "aft" may refer to a back of the aircraft based on an anticipated direction of travel of the aircraft. Additionally, the terms "upstream" and "downstream" refer to the relative direction with respect to fluid flow in a fluid pathway. For example, "upstream" refers to the direction from which the fluid flows, and "downstream" refers to the direction to which the fluid flows.

The present disclosure provides for an aircraft having a fuselage extending between a forward end and an aft end, generally along a longitudinal direction of the aircraft. The aircraft additionally includes a propulsor mounted to the fuselage at the aft end of the fuselage. The propulsor may be, for example, an aft fan configured to ingest and re-energize a boundary layer airflow over the fuselage of the aircraft. The propulsor additionally includes an outer nacelle, with the outer nacelle defining an inlet to the propulsor. Depending on an operating condition of the aircraft, it may be beneficial to alter an airflow towards the propulsor or into the propulsor to, e.g., reduce an amount of drag when the propulsor is not in use, or direct an additional amount of boundary layer airflow into the propulsor during certain flight operations. Accordingly, the aircraft further includes a deployable assembly attached to at least one of the fuselage of the aircraft or to the outer nacelle of the propulsor. The deployable assembly is movable between a stowed position and an engaged position. When in the engaged position, the deployable assembly alters an airflow towards the propulsor or into the propulsor through the inlet defined by the outer nacelle.

Figure 2:
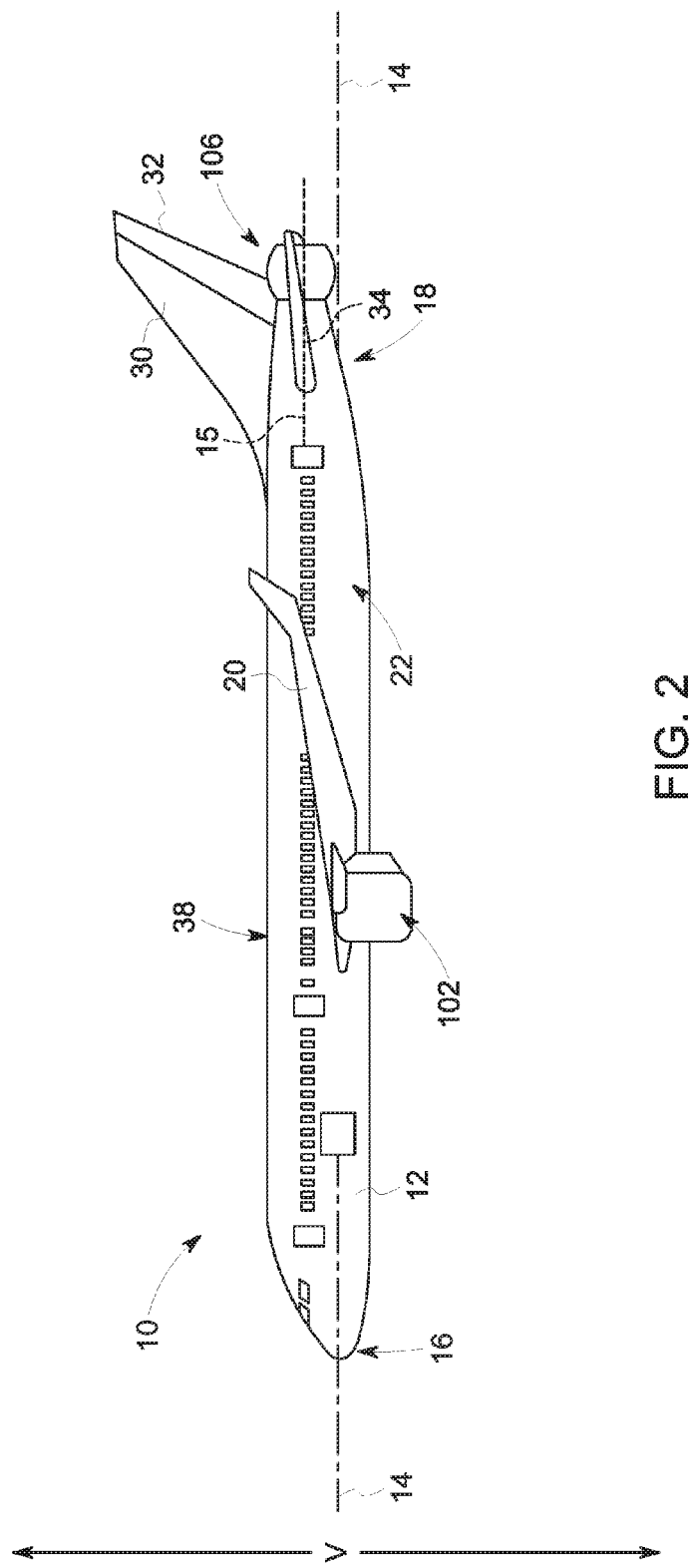
FIG. 2 is a port side view of the exemplary aircraft of FIG. 1

Referring now to the drawings, wherein identical numerals indicate the same elements throughout the figures, FIG. 1 provides a top view of an exemplary aircraft 10 as may incorporate various embodiments of the present invention. FIG. 2 provides a port side view of the aircraft 10 as illustrated in FIG. 1. As shown in FIGS. 1 and 2 collectively, the aircraft 10 defines a longitudinal centerline 14 that extends therethrough, a vertical direction V, and a lateral direction L. Moreover, the aircraft 10 includes a fuselage 12 extending longitudinally between a forward end 16 and an aft end 18. The aircraft 10 further defines a mean line 15 extending between the forward end 16 and aft end 18 of the fuselage 12. As used herein, the term "fuselage" generally includes all of the body of the aircraft 10, such as an empennage of the aircraft 10. Additionally, as used herein, the "mean line" refers to a midpoint line extending along a length of the aircraft 10, not taking into account the appendages of the aircraft 10 (such as the wings 20 and stabilizers discussed below).

Moreover, the aircraft 10 further includes a pair of wings 20. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

The exemplary aircraft 10 of FIGS. 1 and 2 includes a propulsion system 100, herein referred to as "system 100". The exemplary system 100 includes a pair of aircraft engines, at least one of which mounted to each of the pair of wings 20, and an aft engine. For the embodiment depicted, the aircraft engines are configured as turbofan jet engines 102, 104 suspended beneath the wings 20 in an under-wing configuration. Additionally, the aft engine is configured as a fan configured to ingest and consume air forming a boundary layer over the fuselage 12 of the aircraft 10. Specifically, for the embodiment depicted, the aft engine is configured as an aft, boundary layer ingestion (BLI) fan ("aft fan 106"), configured to ingest and consume air forming a boundary layer over the fuselage 12 of the aircraft 10. The aft fan 106 is mounted to the fuselage 12 at a location aft of the wings 20 and/or the jet engines 102, 104, such that the mean line 15 extends therethrough. Notably, such a configuration positions a center axis of the aft fan 106 above the centerline 14. Additionally, the aft fan 106 may be mounted parallel to the centerline 14, or at an angle to the centerline 14 (i.e., such that the center axis of the aft fan 106 defines an angle with the centerline 14). Specifically, for the embodiment depicted, the aft fan 106 is fixedly connected to the fuselage 12 at the aft end 18, such that the aft fan 106 is incorporated into or blended with a tail section at the aft end 18. However, it should be appreciated that in various other embodiments, the aft fan 106 may alternatively be positioned at any suitable location of the aft end 18.

In various embodiments, the jet engines 102, 104 may be configured to provide power to an electric generator 108 and/or an energy storage device 110. For example, one or both of the jet engines 102, 104 may be configured to provide mechanical power from a rotating shaft (such as an LP shaft or HP shaft) to the electric generator 108. Additionally, the electric generator 108 may be configured to convert the mechanical power to electrical power and provide such electrical power to one or both of the energy storage device 110 or the aft fan 106. Accordingly, in such an embodiment, the propulsion system 100 may be referred to as a gas-electric propulsion system.

Notably, although the electric generator 108 is depicted schematically, separate from the jet engines 102, 104, in certain embodiments, the electric generator may be configured with one of the jet engines 102, 104, or alternatively, the electric generator 108 may include a plurality of electric generators, with each of the jet engines 102, 104 configured with one of the electric generators 108. For example, in certain exemplary embodiments, at least one of the jet engines 102, 104 may be configured as a high bypass, turbofan jet engine with an electric generator driven by one or more shafts of the turbofan jet engine.

It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner. For example, in other embodiments, the propulsion system 100 may include any suitable number or configuration of jet engines (e.g., turbofan, turboprop, turbojet, etc.). Alternatively still, in other embodiments, the propulsion system 100 may not include underwing mounted jet engines, and may instead include any suitable power source (such as an electric power source) for powering the aft fan 106.

Figure 3:
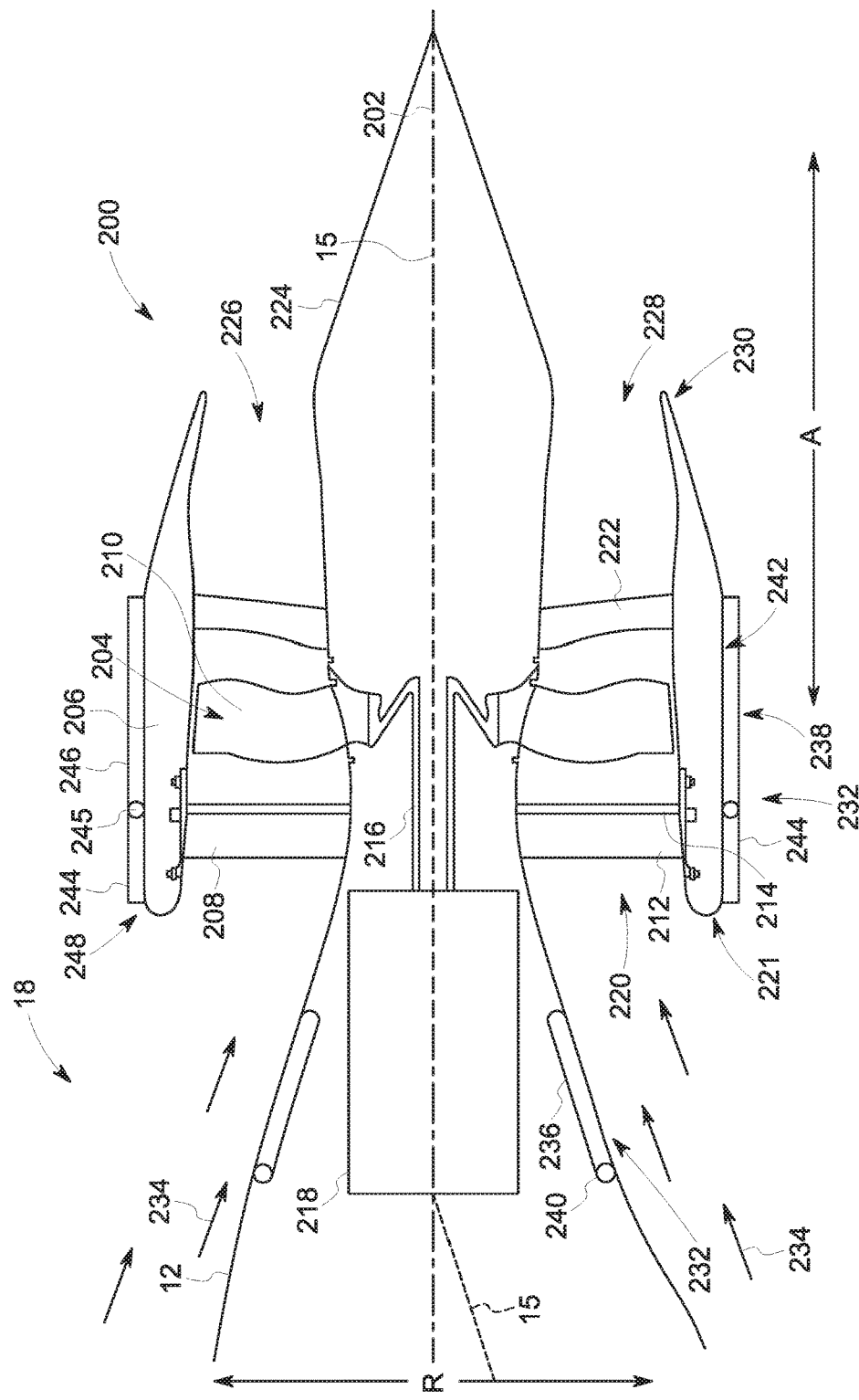
FIG. 3 is a schematic, cross-sectional view of an aft engine in accordance with an exemplary embodiment of the present disclosure.

Referring now to FIG. 3, a schematic, cross-sectional side view of a propulsor in accordance with various embodiments of the present disclosure is provided. The propulsor is, for the embodiment depicted, mounted to an aircraft 10 including a fuselage 12 extending between a forward end 16 and an aft end 18, with the propulsor mounted to the fuselage 12 of the aircraft 10 at the aft end 18 of the fuselage 12. Specifically, for the embodiment depicted, the propulsor is configured as an aft engine, or more particularly, is configured as a boundary layer ingestion (BLI), aft fan 200. The aft fan 200 may be configured in substantially the same manner as the aft fan 106 described above with reference to FIGS. 1 and 2, and the aircraft 10 may be configured in substantially the same manner as the exemplary aircraft 10 described above with reference to FIGS. 1 and 2.

As shown in FIG. 3, the aft fan 200 defines an axial direction A extending along a longitudinal, axial centerline 202 that extends therethrough for reference. Additionally, the aft fan 200 defines a radial direction R and a circumferential direction C (see FIG. 5).

In general, the aft fan 200 includes a fan 204 rotatable about the axial centerline 202, an outer nacelle 206 extending around a portion of the fan 204, and one or more structural members 208 extending between the nacelle 206 and the fuselage 12 of the aircraft 10. More specifically, the fan 204 includes a plurality of fan blades 210 spaced generally along the circumferential direction C (see FIG. 5), and the one or more structural members 208 extend between the nacelle 206 and the fuselage 12 of the aircraft 10 at a location forward of the plurality of fan blades 210, for mounting the aft fan 200 to the aircraft 10. The one or more structural members 208 for the embodiment depicted extend substantially along the radial direction R of the aft fan 200 between the nacelle 206 and the fuselage 12 of the aircraft 10 for mounting the aft fan 200 to the fuselage 12 of the aircraft 10. It should be appreciated, that as used herein, terms of approximation, such as "approximately," "substantially," or "about," refer to being within a ten percent margin of error/variation.

Additionally, for the embodiment depicted, the one or more structural members 208 are configured as inlet guide vanes for the fan 204. Specifically, the one or more structural members 208 are shaped and oriented to direct and condition a flow of air into the aft fan 200 to, e.g., increase an efficiency of the aft fan 200, or reduce a distortion of the air flowing into the aft fan 200.

In certain exemplary embodiments, the one or more structural members 208 may be configured as fixed inlet guide vanes extending between the nacelle 206 and the fuselage 12 of the aircraft 10. However, for the embodiment depicted, the one or more structural members 208 are configured as variable inlet guide vanes. More specifically, the structural member 208 extends between a forward, upstream end and an aft, downstream end. A body 212 of the structural member 208 depicted is fixed relative to the nacelle 206 of the aft fan 200 and the fuselage 12 of the aircraft 10. However, the structural member 208 additionally includes a flap 214 at the aft end configured to rotate about a substantially radial axis (not labeled). Specifically, as shown, the flap 214 is configured to rotate between various positions, such that the structural member 208 may vary a direction in which air flowing thereover is directed.

Referring still to FIG. 3, the nacelle 206 extends around and encircles the plurality of fan blades 210, and also extends around the fuselage 12 of the aircraft 10, the mean line 15 of the aircraft 10, and the axial centerline 202 when, as in FIG. 3, the aft fan 200 is mounted to the aircraft 10. Notably, as used herein, the term "nacelle" includes the nacelle as well as any structural fan casing.

As is also depicted in FIG. 3, the fan 204 additionally includes a fan shaft 216 with the plurality of fan blades 210 attached thereto. Although not depicted, the fan shaft 216 may be rotatably supported by one or more bearings located forward of the plurality of fan blades 210 and, optionally, by one or more bearings located aft of the plurality of fan blades 210. Such bearings may be any suitable one of, or combination of, roller bearings, ball bearings, thrust bearings, gas bearings, etc.

In certain exemplary embodiments, the plurality of fan blades 210 may be attached in a fixed manner to the fan shaft 216, or alternatively, the plurality of fan blades 210 may be rotatably attached to the fan shaft 216. For example, the plurality of fan blades 210 may be attached to the fan shaft 216 such that a pitch of each of the plurality of fan blades 210 may be changed, e.g., in unison, by a pitch change mechanism (not shown). Changing the pitch of the plurality of fan blades 210 may increase an efficiency of the aft fan 200 and/or may allow the aft fan 200 to achieve a desired thrust. With such an exemplary embodiment, the aft fan 200 may be referred to as a variable pitch aft fan 200.

The fan shaft 216 is mechanically coupled to a power source 218 located at least partially within the fuselage 12 of the aircraft 10, forward of the plurality of fan blades 210. Although not depicted, in certain exemplary embodiments the fan shaft 216 may be mechanically coupled to the power source 218 through a gearbox configured to modify a rotational speed of the power source 218, such that the fan 204 of the aft fan 200 rotates at a desired rotational speed.

In certain exemplary embodiments, the aft fan 200 may be configured with a gas-electric propulsion system, such as the gas-electric propulsion system 100 described above with reference to FIG. 1. In such an embodiment, the power source 218 may be an electric motor that receives power from one or both of an energy storage device or an electric generator—such as the energy storage device 110 or electric generator 108 of FIGS. 1 and 2, the electric generator 108 converting mechanical power received from one or more under-wing mounted aircraft 10 engines to electric power. However, in other exemplary embodiments, the power source 218 may instead be any other suitable power source. For example, the power source 218 may alternatively be configured as a gas engine, such as a gas turbine engine or internal combustion engine. Moreover, in certain exemplary embodiments, the power source 218 may be positioned at any other suitable location within, e.g., the fuselage 12 of the aircraft 10 or the aft fan 200. For example, in certain exemplary embodiments, the power source 218 may be configured as a gas turbine engine positioned at least partially within the aft fan 200.

Referring still to FIG. 3, the aft fan 200, or rather the outer nacelle 206 of the aft fan 200, defines an inlet 220 at a forward end between a forward end 220 of the nacelle 206 and the fuselage 12 of the aircraft 10/cowling of the aft fan 200. As mentioned above, the nacelle 206 of the aft fan 200 extends around the mean line 15 of the aircraft 10, around the fuselage 12 of the aircraft 10 at the aft end 18 of the aircraft 10, and around the axial centerline 202. Specifically, for the embodiment depicted, the outer nacelle 206 of the aft fan 200 extends substantially three hundred sixty degrees (360°) around the axial centerline 202 and the fuselage 12 of the aircraft 10 when, such as in the embodiment depicted, the aft fan 200 is mounted to the aircraft 10.

Notably, the exemplary aft fan 200 depicted additionally includes one or more outlet guide vanes 222 and a tail cone 224. The one or more outlet guide vanes 222 for the embodiment depicted extend between the nacelle 206 and the tail cone 224 for directing a flow of air through the aft fan 200, and optionally for adding strength and rigidity to the aft fan 200. The outlet guide vanes 222 may be evenly spaced along the circumferential direction C, or may have any other suitable spacing. Additionally, the outlet guide vanes 222 may be fixed outlet guide vanes, or alternatively may be variable outlet guide vanes. Inclusion of the plurality of outlet guide vanes 222 extending between the nacelle 206 and the tail cone 224 may allow for, e.g., tighter clearances between the plurality of fan blades 210 and the nacelle 206, such that an efficiency of the aft fan 200 may be maximized. It should be appreciated, however, that in other embodiments, the aft fan 200 may include any other suitable structural configuration, and accordingly may not include one or more of the structural members 208 or outlet guide vanes 222.

Aft of the plurality of fan blades 210, and for the embodiment depicted, aft of the one or more outlet guide vanes 222, the aft fan 200 additionally defines a nozzle 226 between the nacelle 206 and the tail cone 224. The nozzle 226 may be configured to generate an amount of thrust from the air flowing therethrough, and the tail cone 224 may be shaped to minimize an amount of drag on the aft fan 200. However, in other embodiments, the tail cone 224 may have any other shape and may, e.g., end forward of an aft end 230 of the nacelle 206 such that the tail cone 224 is enclosed by the nacelle 206 at an aft end of the tail cone 224. Notably, the outer nacelle 206 additionally defines an exhaust 228 at the aft end 230 of the outer nacelle 206 with the tail cone 224/cowling of the aft fan 200.

It should be appreciated, however, that the exemplary aft fan 200 is provided by way of example only. In other exemplary embodiments, the aft fan 200 may have any other suitable configuration. For example, in other exemplary embodiments, the aft fan 200 may be mounted to the fuselage 12 using any suitable mounting structure, and further may include any suitable structural support configuration within the aft fan 200.

Figure 4:
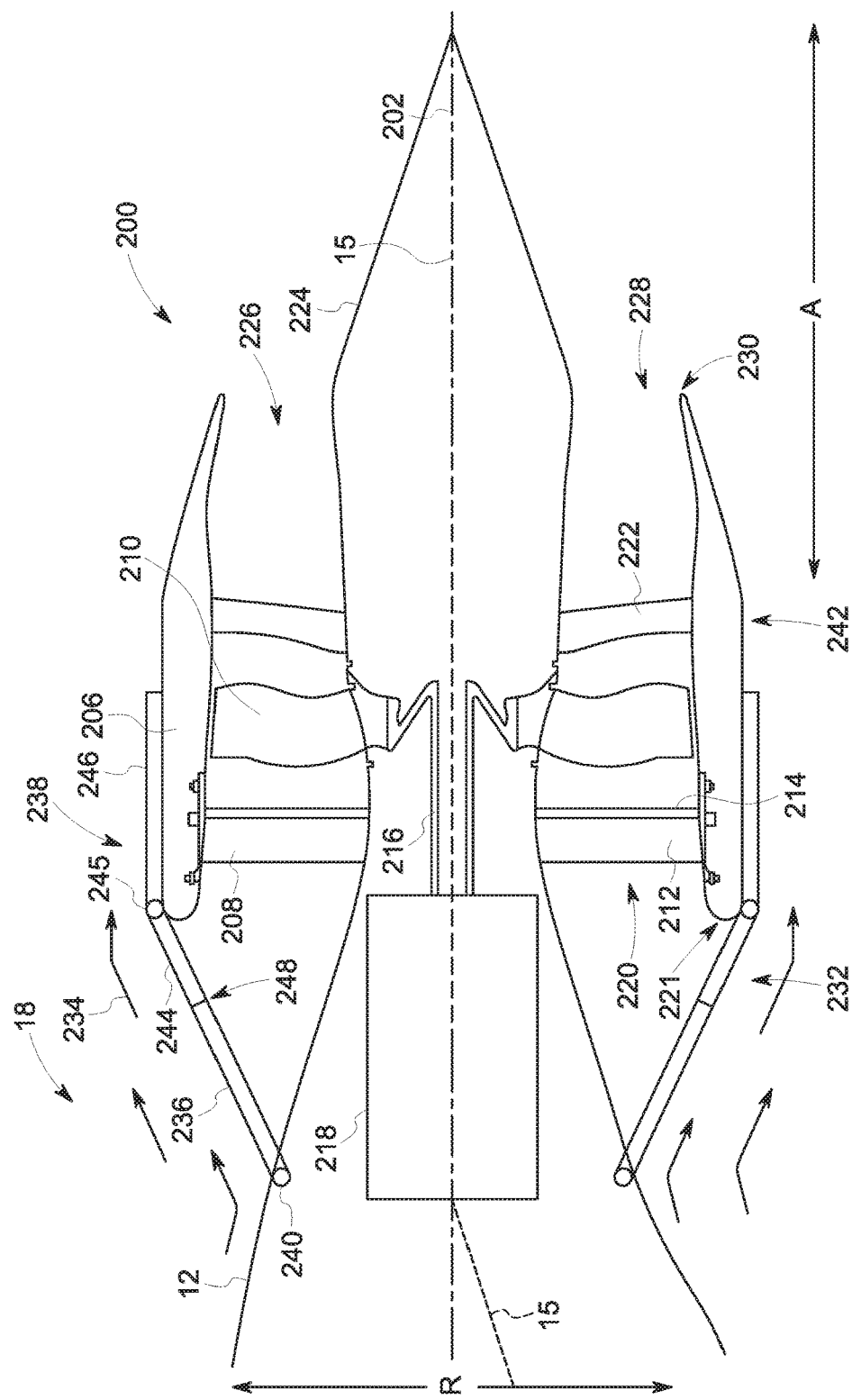
FIG. 4 is another schematic, cross-sectional view of the exemplary aft engine of FIG. 3.

Reference will now be made also to FIG. 4 providing another side, cross-sectional view of the exemplary aircraft 10 and aft fan 200 of FIG. 3. As is depicted, the aircraft 10 and/or aft fan 200 additionally includes a deployable assembly 232 attached to at least one of the fuselage 12 of the aircraft 10 or the outer nacelle 206 of the aft fan 200. The deployable assembly 232 is movable between a stowed position (FIG. 3) and an engaged position (FIG. 4). When in the stowed position, the deployable assembly 232 is configured to have substantially no effect on the airflow 234 over the aft end 18 of the fuselage 12 of the aircraft 10 or through the aft fan 200.

By contrast, the deployable assembly 232 alters an airflow 234 towards the aft fan 200 or into the aft fan 200 through the inlet 220 defined by the outer nacelle 206 of the aft fan 200 when in the engaged position. More specifically, for the embodiment depicted, the engaged position of the exemplary deployable assembly 232 is a closed position. When in the closed position, the deployable assembly 232 blocks substantially all of the airflow 234 from flowing into/through the inlet 220 defined by the outer nacelle 206 of the aft fan 200. More specifically, for the embodiment depicted, the deployable assembly 232 includes a plurality of blocker doors 236 attached to the fuselage 12 of the aircraft 10 upstream of the aft fan 200 and additionally includes a plurality of nacelle panels 238 attached to the outer nacelle 206.

Each of the plurality of blocker doors 236 include a hinge 240, and each blocker door 236 is rotatably attached to the fuselage 12 at the respective hinge 240. The plurality of blocker doors 236 may be configured with the fuselage 12 of the aircraft 10, such that they are substantially recessed in a surface of the fuselage 12 of the aircraft 10 when in the stowed position (FIG. 3). By contrast when in the engaged position, or closed position, the plurality of blocker doors 236 are rotated at the respective hinges 240 outwardly, away from the axial centerline 202 of the aft fan 200 (FIG. 4), and away from the fuselage 12 such that the plurality of blocker doors 236 at least partially block the airflow 234 over the aft end 18 of the fuselage 12 from flowing into/through the inlet 220 defined by the outer nacelle 206. For the embodiment depicted, each of the plurality of blocker doors 236 may be rotated at least about thirty degrees (30°) between the stowed position and the closed position. For example, each of the plurality of blocker doors 236 may be rotated at least about forty degrees (40°), such as at least about fifty degrees (50°), such as at least about sixty degrees (60°) between the stowed position and the closed position.

Further, as stated, the plurality of nacelle panels 238 are attached to the outer nacelle 206. More specifically, for the embodiment depicted, the nacelle panels 238 are slidably attached to a radially outer side 242 of the outer nacelle 206. The nacelle panels 238 are movable generally along the axial centerline 202, such that the nacelle panels 238 slide or translate from a position aft of the inlet 220 defined by the outer nacelle 206 when in the stowed position to a position at least partially forward of the inlet 220 defined by the outer nacelle 206 when in the engaged position. For example, for the embodiment depicted, when in the engaged position, or closed position, the plurality of nacelle panels 238 translate at least partially forward of the inlet 220 defined by the outer nacelle 206 and additionally include a portion that rotates at least partially inward towards the axial centerline 202 to block at least a portion of the airflow 234 over the aft end 18 of the fuselage 12. More specifically, each of the plurality of nacelle panels 238 depicted in FIGS. 3 and 4 include a hinged portion 244 rotatably connected to a body portion 246 through a respective hinges 245. The hinged portions 244 of the nacelle panels 238 are positioned at forward ends 248 of the respective nacelle panels 238. For the embodiment depicted, when the nacelle panels 238 are moved to the engaged, or closed, position, the hinged portions 244 of the nacelle panels 238 rotate inwardly towards the axial centerline 202, to a position at least partially in front of the inlet 220 of the outer nacelle 206.

Moreover, for the embodiment depicted, the hinged portions 244 of the nacelle panels 238 meet with the blocker doors 236, such that the nacelle panels 238 and blocker doors 236 together block substantially all of the airflow 234 over the aft end 18 of the fuselage 12 from flowing into/through the inlet 220 defined by the outer nacelle 206 of the aft fan 200. Such a configuration may be useful to shut off an airflow 234 through the aft fan 200 during certain operations in which the aft fan 200 is not in use. For example, in certain exemplary aspects, the aft fan 200 may not be used during a takeoff operating mode of the aircraft 10. With such an exemplary aspect, the deployable assembly 232 may be moved to the engaged position during takeoff of the aircraft 10, and then subsequently moved to the stowed position during cruise operations, wherein the aft fan 200 may be utilized.

Figure 5:
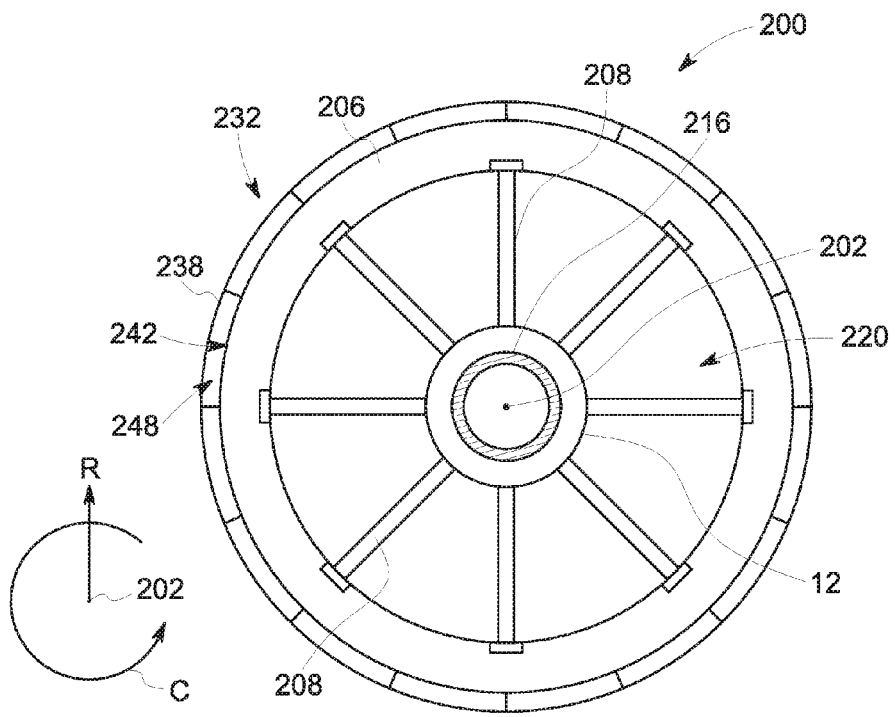
FIG. 5 is a schematic, cross-sectional view of the exemplary aft engine of FIG. 3, viewed along an axial centerline of the exemplary aft engine of FIG. 3.
Figure 6:
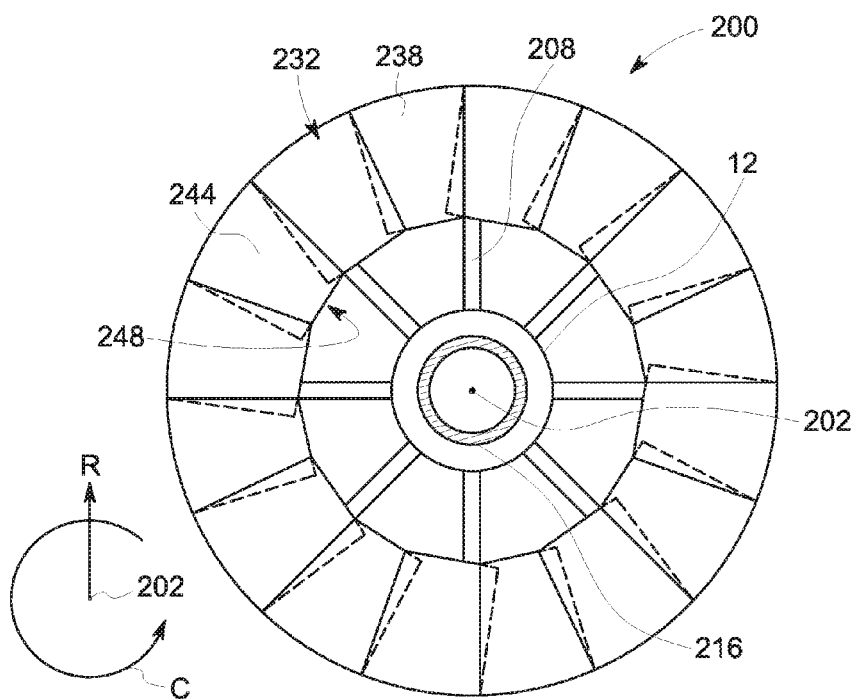
FIG. 6 is a schematic, cross-sectional view of the exemplary aft engine of FIG. 4, viewed along the axial centerline of the exemplary aft engine of FIG. 4.

Referring now briefly to FIGS. 5 and 6, axial views are provided of the aft fan 200, from a positioned forward of the aft fan 200. The deployable assembly 232 is in the stowed position in FIG. 5, and is in the engaged position in FIG. 6. As is depicted, the aft fan 200 defines the circumferential direction C. For the embodiment depicted, the nacelle panels 238 of the deployable assembly 232 are spaced along the circumferential direction C, and more particularly, are spaced substantially evenly along the circumferential direction C. When in the stowed position (FIG. 5), each of the plurality of nacelle panels 238 are positioned outward of the inlet 220 of the outer nacelle 206 along the radial direction R, so as to not influence an airflow 234 into the inlet 220 of the outer nacelle 206. By contrast, when in the engaged, or closed, position (FIG. 6), the hinged portions 244 of the nacelle panels 238 are rotated inwardly towards the axial centerline 202 such that the hinged portions 244 of the nacelle panels 238 are positioned in front of the inlet 220 so as to at least partially block an airflow 234 from flowing into/through the inlet 220 of the outer nacelle 206. Notably, as is depicted partially in phantom in FIG. 6, the exemplary nacelle panels 238, or specifically, the hinged portions 244 of the nacelle panels 238, are configured to overlap so as to provide a substantially continuous blocking surface along the circumferential direction C. Notably, although not depicted, the blocker doors 236 of the exemplary deployable assembly 232 may additionally be spaced substantially evenly along the circumferential direction C, and may be configured to overlap in a similar manner when in the stowed position (and not in the engaged position, or at least to a lesser extent when in the engaged position), such that when in the engaged position, the plurality of blocker doors 236 may also provide for a substantially continuous blocking surface along the circumferential direction C. Additionally, or alternatively, in other embodiments the hinged portions 244 of the nacelle panels 238 may by tapered such that they need not overlap, or not need overlap to the extent depicted.

Moreover, although not depicted, in certain exemplary embodiments, the deployable assembly 232 may further include a plurality of actuation members for actuating the blocker doors 236, the nacelle panels 238, and/or the hinged portions 244 of the nacelle panels 238. The actuation members may be one or more of electric actuation members (including, e.g., electric motors), pneumatic actuation members, or hydraulic actuation members. Further, these actuation members may be operatively connected to a controller of the aircraft 10 for controlling movement of the deployable assembly 232 in view of certain operation parameters or conditions of the aircraft 10.

It should be appreciated, however, that in other embodiments, the deployable assembly 232 may be configured in any other suitable manner. For example, in other embodiments, the deployable assembly 232 may not extend continuously along the circumferential direction C, and instead may only be positioned at certain circumferential locations. For example, in certain embodiments, the deployable assembly 232 may only be positioned at one or both of a top section and a bottom section of the aft fan 200, or at any other suitable position.

Figure 7:
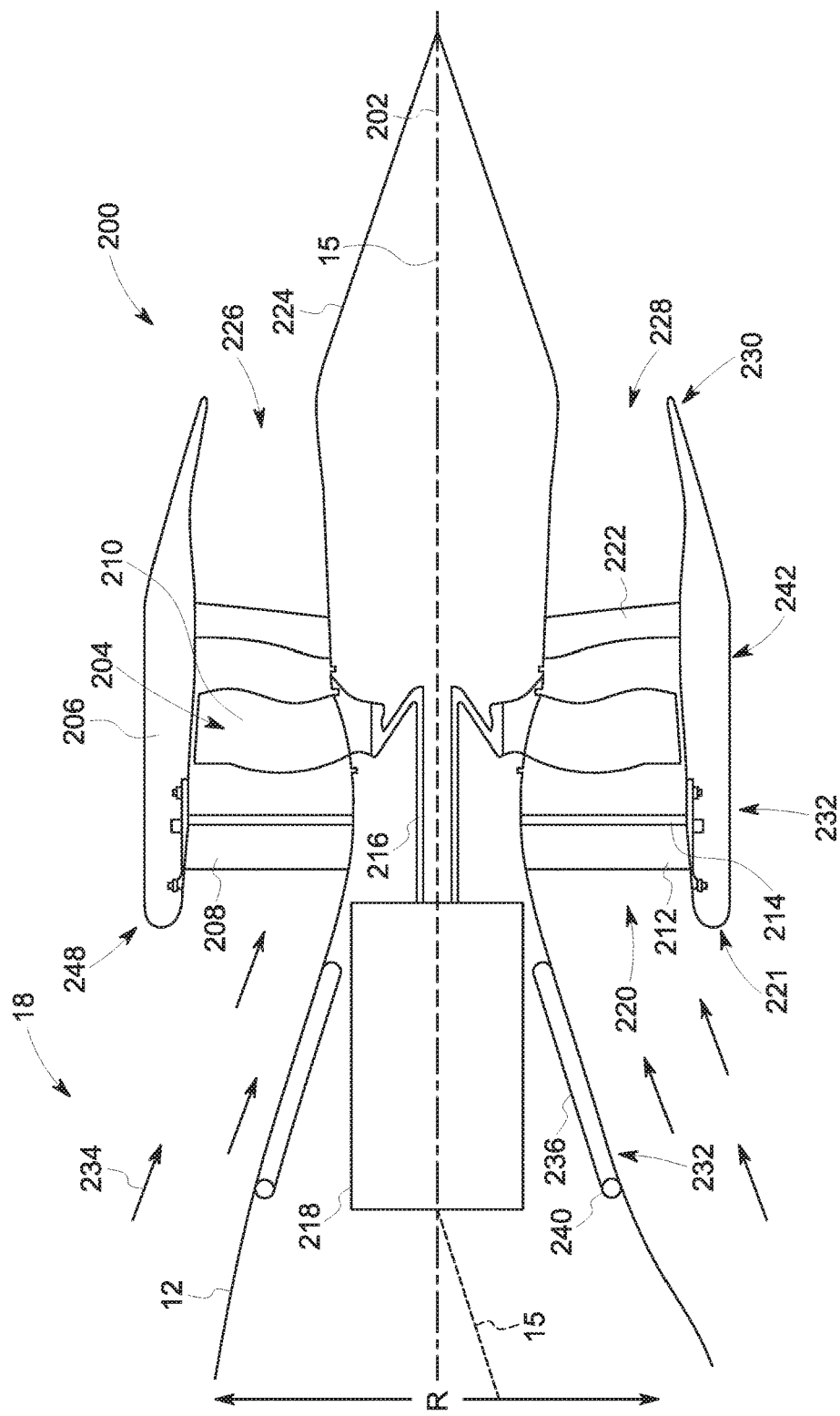
FIG. 7 is a schematic, cross-sectional view of an aft engine in accordance with another exemplary embodiment of the present disclosure.
Figure 8:
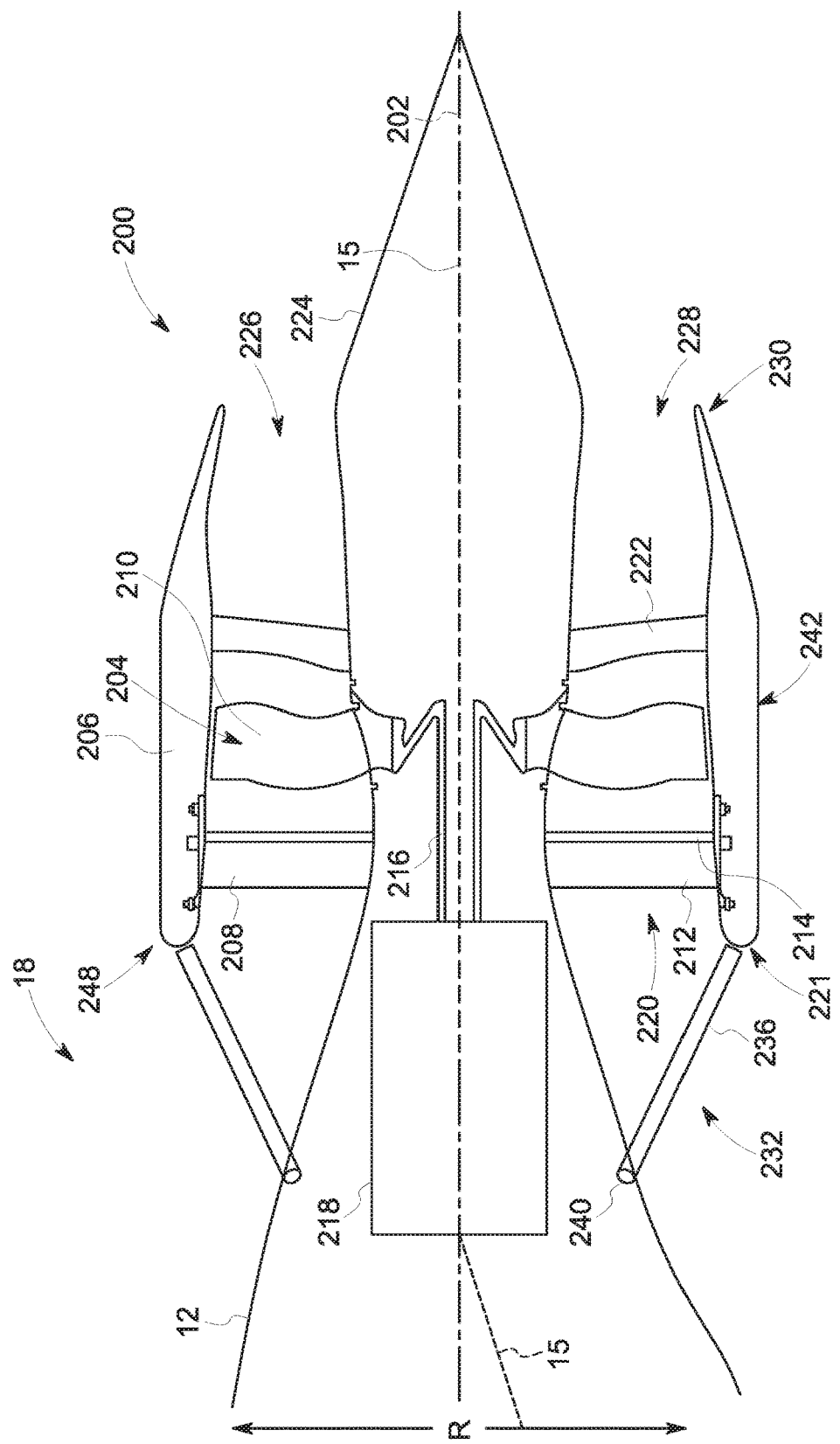
FIG. 8 is another schematic, cross-sectional view of the exemplary aft engine of FIG. 7.

Additionally, referring now to FIGS. 7 and 8, an aircraft 10 and an aft fan 200 are provided including a deployable assembly 232 in accordance with another exemplary embodiment of the present disclosure. The aircraft 10 and aft fan 200 may be configured in substantially the same manner as exemplary aircraft 10 and aft fan 200 described above with reference to FIGS. 3 and 4. Accordingly, the same numbering may refer to the same or similar part.

For example, the exemplary aft fan 200 depicted in FIGS. 7 and 8 is mounted to a fuselage 12 of the aircraft 10 at an aft end 18 of the fuselage 12. Additionally, the aft fan 200 generally includes an outer nacelle 206 extending substantially 360° around an axial centerline 202 of the aft fan 200, the outer nacelle 206 defining an inlet 220 to the aft fan 200 at a forward end 221. Moreover, the deployable assembly 232 depicted is attached to at least one of the fuselage 12 or the outer nacelle 206 and movable between a stowed position and an engaged position. Additionally, for the embodiment depicted, the engaged position of the deployable assembly 232 is configured as a closed position for blocking an airflow 234 over the aft end 18 of the aircraft 10 from flowing into/through the inlet 220 of the outer nacelle 206.

More specifically, for the embodiment depicted, the deployable assembly 232 includes a plurality of blocker doors 236 rotatably attached to the fuselage 12 at respective hinges 240, and spaced along a circumferential direction C of the aft fan 200. However, for the embodiment depicted, the deployable assembly 232 does not include the nacelle panels 238. Instead, for the embodiment depicted, the plurality of blocker doors 236 are sized such that when moved from the stowed position to the engaged, or closed, position, the plurality of blocker doors 236 extend substantially continuously from the fuselage 12 of the aircraft 10 to a forward end 221 of the outer nacelle 206 of the aft fan 200. With such an exemplary embodiment, the blocker doors 236 may be sufficient to block substantially all of an airflow 234 over the aft end 18 of the fuselage 12 from flowing into/through the inlet 220 defined by the outer nacelle 206.

However, in still other embodiments, the deployable assembly 232 may still be configured in any other suitable manner. For example, referring now to FIGS. 9 and 10, an aircraft 10 and an aft fan 200 are provided including a deployable assembly 232 in accordance with still another exemplary embodiment of the present disclosure. The aircraft 10 and aft fan 200 of FIGS. 9 and 10 may be configured in substantially the same manner as exemplary aircraft 10 and an aft fan 200 described above with reference to FIGS. 3 and 4. Accordingly, the same numbering may refer to the same or similar part.

Figure 9:
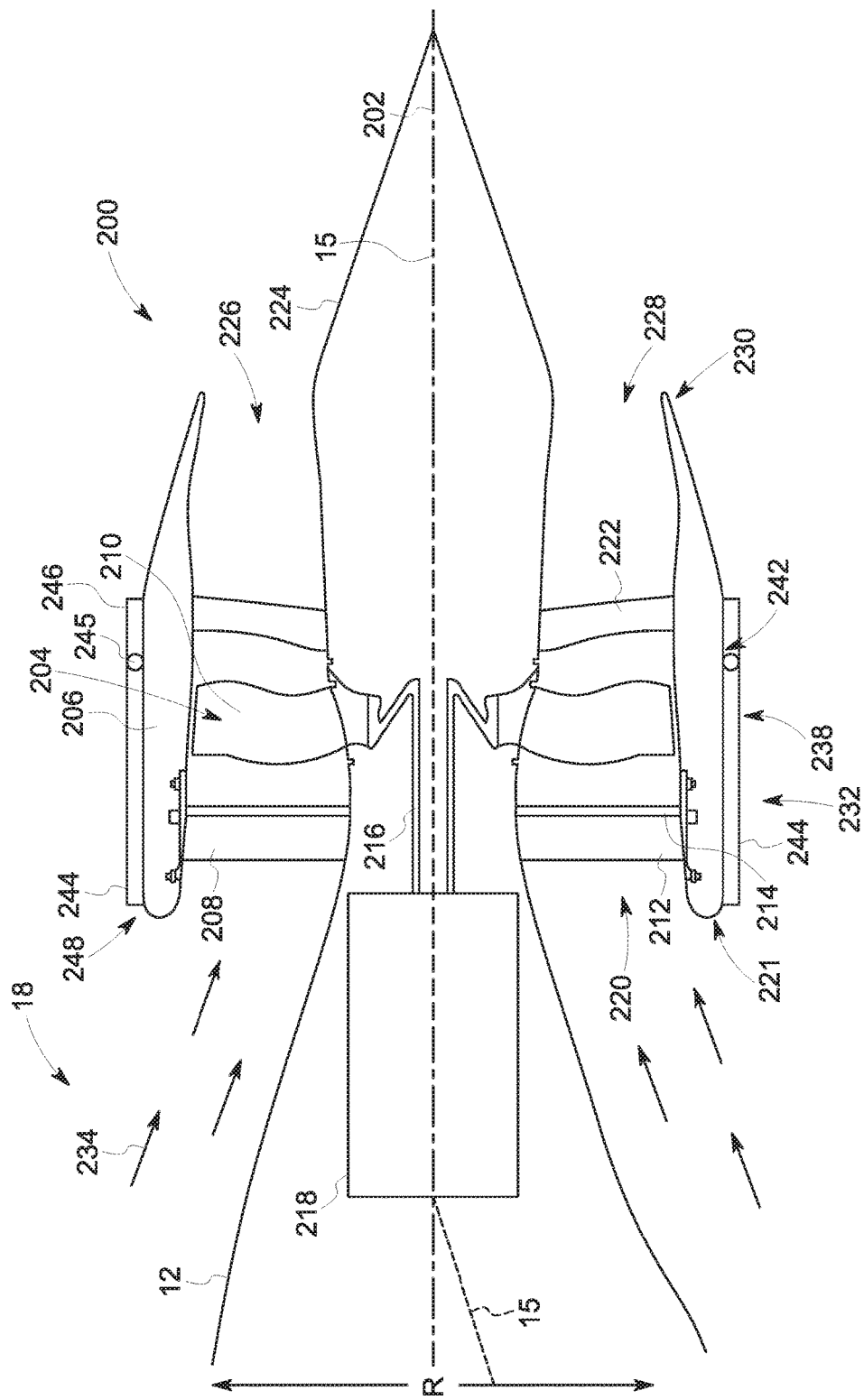
FIG. 9 is a schematic, cross-sectional view of an aft engine in accordance with yet another exemplary embodiment of the present disclosure.
Figure 10:
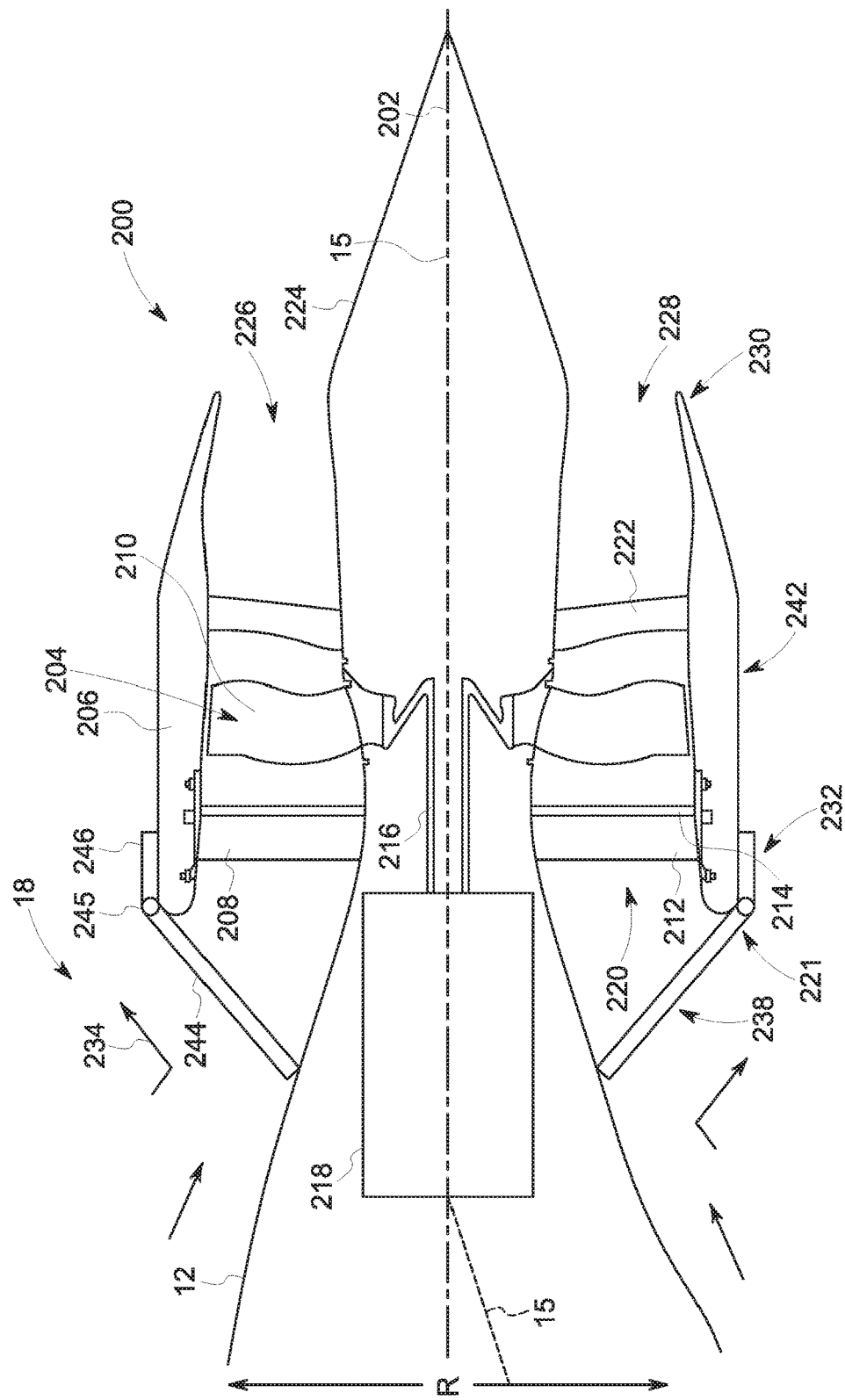
FIG. 10 is another schematic, cross-sectional view of the exemplary aft engine of FIG. 9.

For example, the exemplary aft fan 200 depicted in FIGS. 9 and 10 is mounted to a fuselage 12 of the aircraft 10 at an aft end 18 of the fuselage 12. Additionally, the aft fan 200 generally includes an outer nacelle 206 extending substantially 360° around an axial centerline 202 of the aft fan 200, the outer nacelle 206 defining an inlet 220 to the aft fan 200 at a forward end 221. Moreover, the deployable assembly 232 depicted is attached to at least one of the fuselage 12 or the outer nacelle 206 and movable between a stowed position an engaged position. Additionally, for the embodiment depicted, the engaged position of the deployable assembly 232 is configured as a closed position for blocking an airflow 234 over the aft end 18 of the aircraft 10 from flowing into/through the inlet 220 of the outer nacelle 206.

More specifically, for the embodiment depicted, the deployable assembly 232 includes a plurality of nacelle panels 238 attached to the outer nacelle 206 and spaced along the circumferential direction C of the aft fan 200. However, for the embodiment depicted, the deployable assembly 232 does not include the plurality of blocker doors 236. Instead, for the embodiment depicted, the plurality of nacelle panels 238 are sized such that when moved from the stowed position to the engaged, or closed, position, the hinged portions 244 of the plurality of nacelle panels 238 extend substantially continuously from the outer nacelle 206 of the aft fan 200 to the fuselage 12 of the aircraft 10. With such an exemplary embodiment, the plurality of nacelle panels 238 may be sufficient to block substantially all of an airflow 234 over the aft end 18 of the fuselage 12 from flowing into/through the inlet 220 defined by the outer nacelle 206.

However, in still other embodiments, the deployable assembly 232 may still have any other suitable configuration. For example, referring now to FIGS. 11 and 12, an aircraft 10 and an aft fan 200 are provided including a deployable assembly 232 in accordance with yet another exemplary embodiment of the present disclosure. The aircraft 10 and aft fan 200 of FIGS. 11 and 12 may be configured in substantially the same manner as exemplary aircraft 10 and an aft fan 200 described above with reference to FIGS. 3 and 4. Accordingly, the same numbering may refer to the same or similar part.

Figure 11:
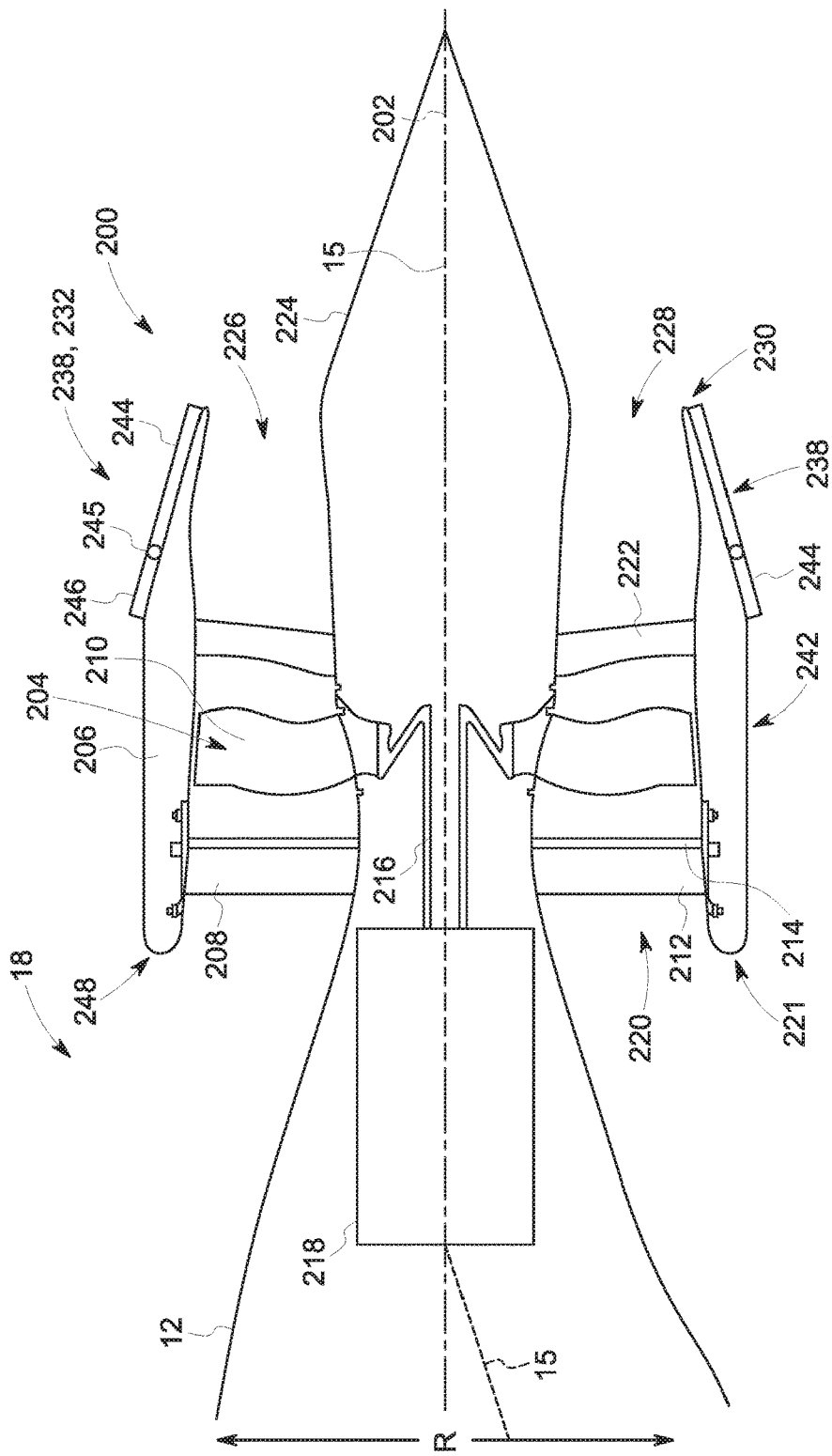
FIG. 11 is a schematic, cross-sectional view of an aft engine in accordance with still another exemplary embodiment of the present disclosure.
Figure 12:
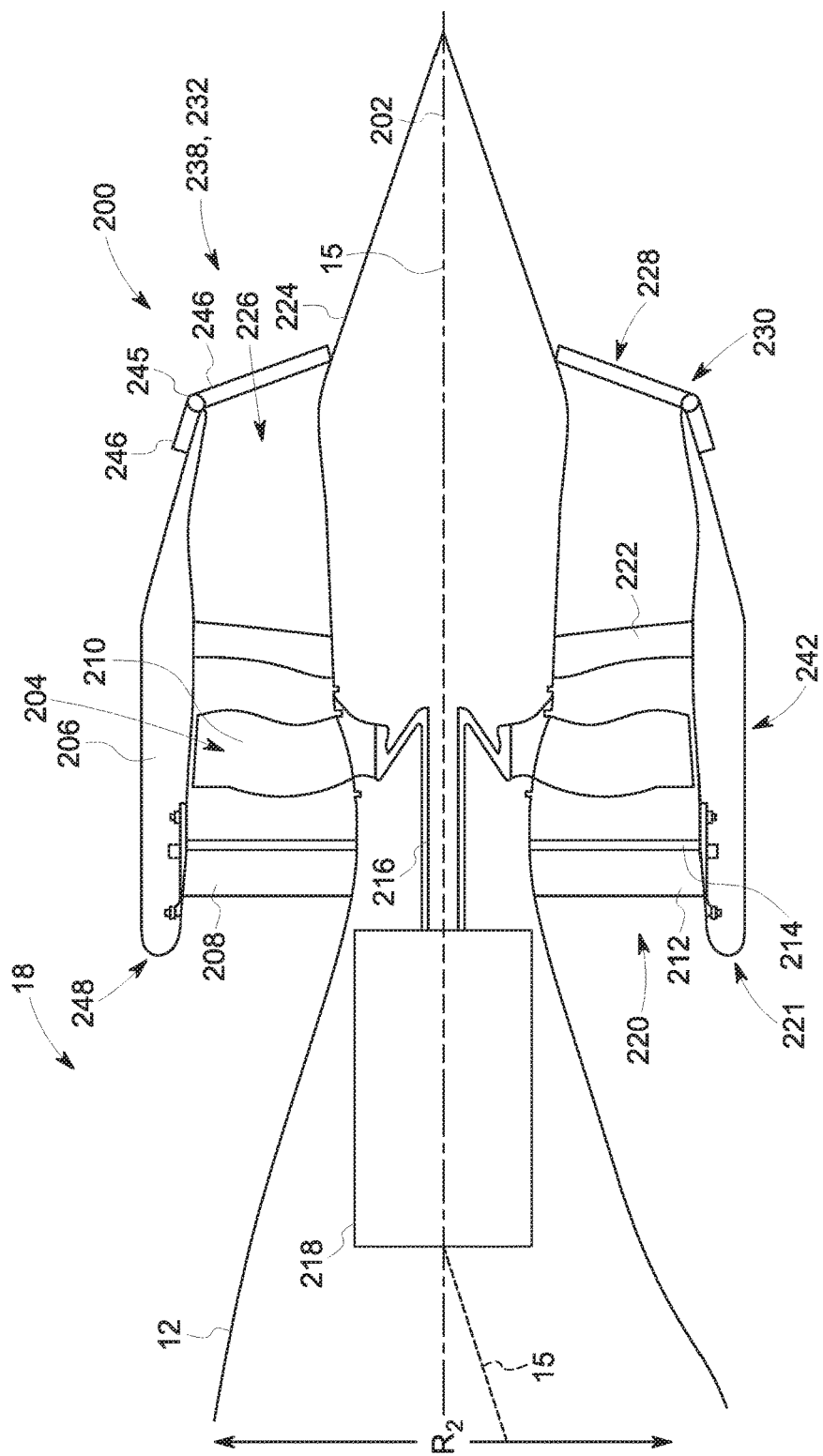
FIG. 12 is another schematic, cross-sectional view of the exemplary aft engine of FIG. 11.

For example, the exemplary aft fan 200 depicted in FIGS. 11 and 12 is mounted to a fuselage 12 of the aircraft 10 at an aft end 18 of the fuselage 12. Additionally, the aft fan 200 generally includes an outer nacelle 206 extending substantially 360° around an axial centerline 202 of the aft fan 200, the outer nacelle 206 defining an inlet 220 to the aft fan 200 at a forward end 221. Moreover, the deployable assembly 232 depicted is attached to at least one of the fuselage 12 or the outer nacelle 206 and movable between a stowed position an engaged position. Additionally, for the embodiment depicted, the engaged position of the deployable assembly 232 is configured as a closed position. While in the closed position, the deployable assembly prevents at least a portion of an airflow 234 over the aft end 18 of the aircraft 10 from flowing into/through the inlet 220 of the outer nacelle 206, while also gradually extending to the tail cone 340, so as to reduce an amount of pressure drag from the aft fan 200 when not in use.

More specifically, for the embodiment depicted, the deployable assembly 232 includes a plurality of nacelle panels 238 attached to the outer nacelle 206, and movable generally along the axial centerline 202 between the stowed position and the engaged position. However, for the embodiment depicted, the plurality of nacelle panels 238 are movable generally along the axial centerline 202 to a position forward of an exhaust 228 the outer nacelle 206 when in the stowed position, and are movable generally along the axial centerline 202 to a position at least partially aft of the exhaust 228 of the outer nacelle 206 when in the engaged position. More specifically, each of the plurality of nacelle panels 238 depicted for the embodiment of FIGS. 11 and 12 include a hinged portion 244 and a body portion 246 rotatably connected by a plurality of hinges 245. However, for the embodiment depicted, the hinged portions 244 are positioned aft of the body portions 246 of the nacelle panels 238 and are movable inward towards the axial centerline 202 of the aft fan 200 when in the engaged position.

When in the engaged, or closed, position, the hinged portions 244 of the plurality of nacelle panels 238 extend substantially continuously between the outer nacelle 206 and a cowling, or more particularly, a tail cone 224, of the aft fan 200. With such a configuration, the deployable assembly 232 may be configured to prevent at least a portion of an airflow 234 over the aft end 18 of the fuselage 12 from flowing through the aft fan 200 when not in use. For example, in certain embodiments, the plurality of nacelle panels 238 may define an angle with the axial centerline 202 less than ninety degrees, as is shown. Specifically, in certain embodiments, the plurality of nacelle panels 238 may define an angle with the axial centerline 202 less than seventy-five degrees, such as less than sixty-five degrees, such as less than fifty-five degrees. Notably, in certain exemplary embodiments, the deployable assembly 232 may further include nacelle panels 238 and/or blocker doors configured in a manner similar to the exemplary deployable assembly 232 depicted in FIGS. 3 and 4, FIGS. 7 and 8, or FIGS. 9 and 10, in addition to the exemplary nacelle panels 238 depicted in FIGS. 11 and 12.

Notably, for the embodiment depicted in FIGS. 11 and 12 the deployable assembly 232 may be moved to the closed position in order to increase an amount of pressure drag during certain operations, such as braking during aircraft landing. By contrast, however, in other embodiments, the exemplary deployable assembly 232 of FIGS. 11 and 12 may be used in conjunction with one or more of the exemplary deployable assemblies 232 described above with reference to, e.g., FIGS. 3 through 10. For example, the aircraft 10 and aft fan 200 may include a first deployable assembly 232 for closing off a forward end/inlet 220 to the aft fan 200 and a second deployable assembly 232 configured in the same or similar manner as depicted in FIGS. 11 and 12 for closing off an aft end/exhaust 228 of the aft fan 200. Such a configuration may reduce an amount of pressure drag on the aft fan 200 when the aft fan is not in use.

Moreover, although for each of the embodiments described above, the exemplary deployable assemblies 232 are movable to an engaged position, with the engaged position configured as a closed position, in other embodiments of the present disclosure the engaged position may additionally, or alternatively be configured as a capture position. For example, referring now to FIG. 13, an aircraft 10 and an aft fan 200 are provided including a deployable assembly 232 in accordance with still another exemplary embodiment of the present disclosure. The aircraft 10 and aft fan 200 of FIG. 13 may be configured in substantially the same manner as the exemplary aircraft 10 and aft fan 200 described above with reference to FIGS. 3 and 4. Accordingly, the same numbering may refer to the same or similar part.

Figure 13:
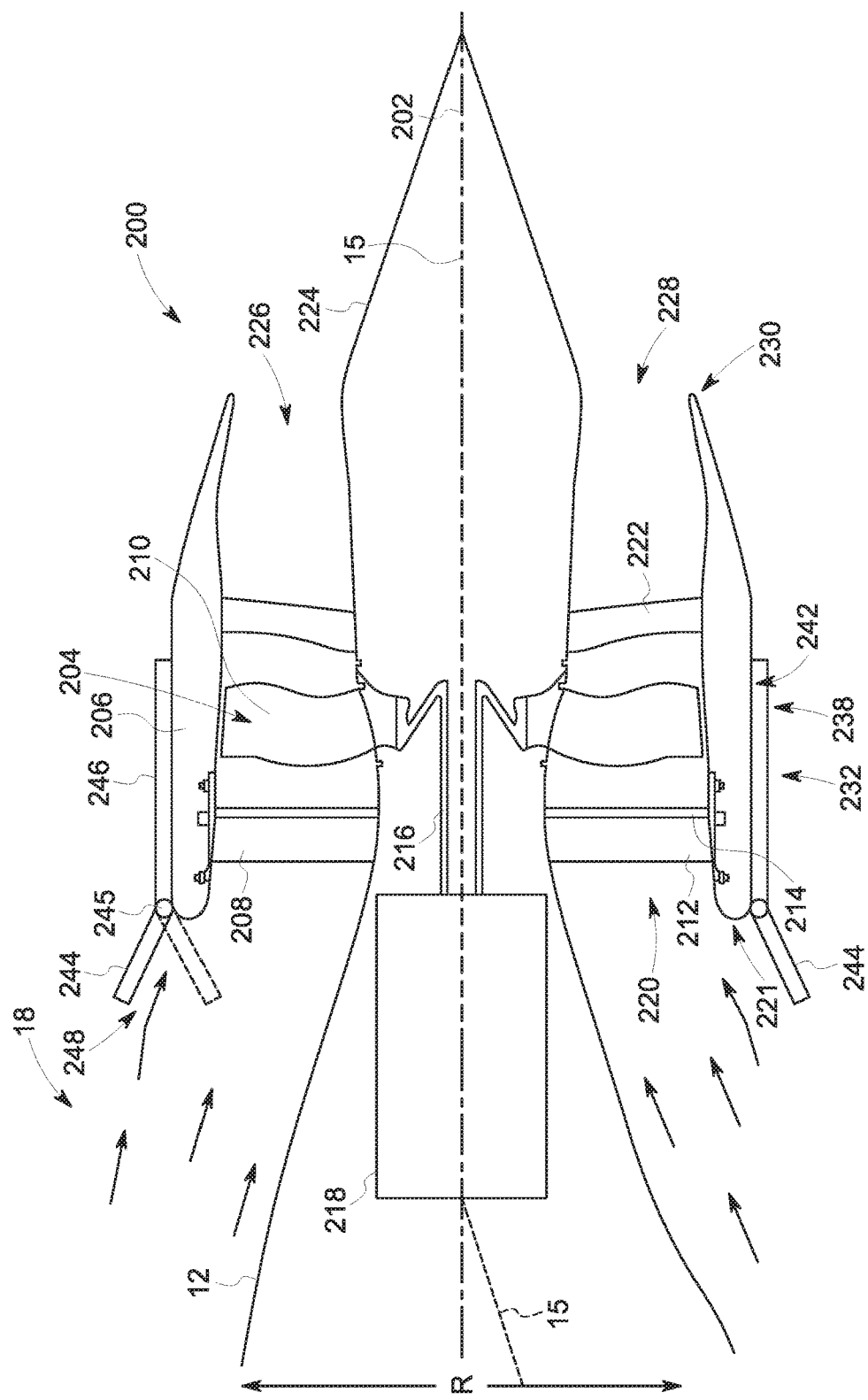
FIG. 13 is a schematic, cross-sectional view of an aft engine in accordance with yet another exemplary embodiment of the present disclosure.

For example, the exemplary aft fan 200 depicted in FIG. 13 is mounted to a fuselage 12 of the aircraft 10 at an aft end 18 of the fuselage 12. Additionally, the aft fan 200 generally includes an outer nacelle 206 extending substantially 360° around an axial centerline 202 of the aft fan 200, the outer nacelle 206 defining an inlet 220 to the aft fan 200 at a forward end 221. Moreover, the deployable assembly 232 depicted is attached to at least one of the fuselage 12 or the outer nacelle 206 and movable between a stowed position and an engaged position.

However, for the embodiment depicted, the engaged position of the deployable assembly 232 is configured as a capture position, such that the deployable assembly 232 directs an airflow 234 into the inlet 220 defined by the outer nacelle 206 when in the capture position. Accordingly, the deployable assembly 232 may be configured to increase an amount of airflow 234 through the aft fan 200 when in the capture position. As with certain of the exemplary embodiments above, the exemplary deployable assembly 232 depicted includes a plurality of nacelle panels 238 attached to the outer nacelle 206 and movable generally along the axial centerline 202 between the stowed position and the capture position. Each of the plurality of nacelle panels 238 generally include a body portion 246 and a hinged portion 244 rotatably attached to the body portion 246 through a hinge 245.

The stowed position of the nacelle panels 238 of the exemplary deployable assembly 232 of FIG. 13 may be the same as the stowed position of the nacelle panels 238 of the exemplary deployable assembly 232 depicted in FIG. 3. By contrast, when moved to the capture position, the plurality of nacelle panels 238 translate at least partially forward of the inlet 220 generally along the axial centerline 202 and rotate at least partially away from the axial centerline 202. In certain exemplary embodiments, the hinged portions 244 of the nacelle panels 238 may be configured to rotate at least about 10° outward, away from the axial centerline 202 when moved to the capture position. For example, in certain embodiments, the hinged portions 244 of the nacelle panels 238 may be configured to rotate at least about 15°, at least about 20°, or at least about 25° outward, away from the axial centerline 202 when moved to the capture position. With such an exemplary embodiment, the deployable assembly 232 may increase an effective cross-sectional area of the inlet 220 defined by the outer nacelle 206. Specifically, with such an embodiment, the deployable assembly 232 may increase an effective cross-sectional area of the inlet 220 defined by the outer nacelle 206 by at least about 10%. For example, with such an exemplary embodiment, the deployable assembly 232 may increase an effective cross-sectional area of the inlet 220 defined by the outer nacelle 206 by at least about 15%, at least about 20%, or at least about 25%.

For the embodiment depicted, the hinged portions 244 of each of the plurality of nacelle panels 238 are configured to rotate at least partially away from the axial centerline 202 when moved to the capture position. However, in certain embodiments, as is depicted in phantom, certain of the hinged portions 244 of the plurality of nacelle panels 238 may be configured to rotate away from the axial centerline 202 when moved the capture position, while certain others of the hinged portions 244 of the plurality of nacelle panels 238 may be configured to rotate towards the axial centerline 202 when moved to the capture position. For example, in at least certain exemplary embodiments, the hinged portions 244 positioned proximate a bottom side of the outer nacelle 206 may be configured to rotate away from the axial centerline 202 when moved to the capture position, while the hinged portions 244 proximate a top side of the outer nacelle 206 may be configured to rotate towards the axial centerline 202 when moved to the capture position. Such a configuration may allow for the aft fan 200 to maximize its efficiency, by capturing more, relatively slow moving boundary layer air flowing over the bottom side of the fuselage 12 and rejecting some of the relatively fast-moving air over the top side of the fuselage 12.

Moreover, in certain embodiments, it may be beneficial to move each of the plurality of nacelle panels 238 in unison, such that the nacelle panels 238 each move between the stowed position and the engaged position at the same time. However, and in other embodiments, at least certain of the plurality of nacelle panels 238 may move independently of the remaining nacelle panels 238 during certain operations. For example, it may be beneficial to vary a degree of the capture position based on certain operating parameters of the aircraft 10 and/or aft fan 200. For example, it may be beneficial to move the plurality of nacelle panels 238 to the capture position depicted in FIG. 13 during relatively slow flight conditions, and subsequently, moved at least certain of the plurality of nacelle panels 238 to the capture position depicted in phantom in FIG. 13 during relatively fast flight conditions. Such a configuration may allow for a maximum efficiency of the aft fan 200, and more particularly, an aircraft 10 with which the aft engine 200 is installed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft comprising:
    a fuselage extending between a forward end and an aft end;
    a propulsor mounted to the fuselage at the aft end of the fuselage, the propulsor comprising an outer nacelle, the outer nacelle defining an inlet to the propulsor; and
    a deployable assembly attached to at least one of the fuselage or the outer nacelle and moveable between a stowed position and an engaged position, the deployable assembly altering an airflow towards the propulsor or into the propulsor through the inlet defined by the outer nacelle when in the engaged position,
    wherein the engaged position is a closed position, wherein the deployable assembly blocks an airflow over the fuselage from flowing into the inlet to the propulsor defined by the outer nacelle when in the closed position, and
    wherein the propulsor defines an axial centerline, wherein the deployable assembly comprises a plurality of nacelle panels attached to the outer nacelle, wherein the plurality of nacelle panels translate at least partially forward of the inlet defined by the outer nacelle and rotate at least partially inward towards the axial centerline when in the closed position.

2. The aircraft of claim 1, wherein the deployable assembly comprises a plurality of blocker doors attached to the fuselage of the aircraft upstream of the propulsor, and wherein the plurality of blocker doors at least partially block an airflow over the fuselage from flowing into the inlet defined by the outer nacelle when in the closed position.

3. An aircraft comprising:
    a fuselage extending between a forward end and an aft end;
    a propulsor mounted to the fuselage at the aft end of the fuselage, the propulsor comprising an outer nacelle, the outer nacelle defining an inlet to the propulsor; and a deployable assembly attached to at least one of the fuselage or the outer nacelle and moveable between a stowed position and an engaged position, the deployable assembly altering an airflow towards the propulsor or into the propulsor through the inlet defined by the outer nacelle when in the engaged position,
    wherein the engaged position is a capture position, wherein the deployable assembly directs an airflow into the inlet defined by the outer nacelle when in the capture position, and
    wherein the propulsor defines an axial centerline, wherein the deployable assembly comprises a plurality of nacelle panels attached to the outer nacelle, wherein the plurality of nacelle panels translate at least partially forward of the inlet defined by the outer nacelle and rotate at least partially away from the axial centerline when in the capture position.

4. The aircraft of claim 1, wherein the propulsor is a fan defining an axial centerline, wherein the outer nacelle extends substantially 360° around the axial centerline.

5. The aircraft of claim 4, wherein the propulsor defines a circumferential direction, and wherein the plurality of nacelle panels are spaced along the circumferential direction.

6. The aircraft of claim 5, wherein the plurality of nacelle panels are movable generally along the axial centerline to a position at least partially forward of the inlet defined by the outer nacelle when in the engaged position, and wherein the plurality of nacelle panels are movable generally along the axial centerline to a position aft of the inlet defined by the outer nacelle when in the stowed position.

7. The aircraft of claim 5, wherein the plurality of nacelle panels each include a hinged portion at a forward end movable inward towards the axial centerline of the propulsor or outward away from the axial centerline of the propulsor.

8. The aircraft of claim 5, wherein each of the plurality of nacelle panels are movable in unison.

9. The aircraft of claim 5, wherein at least certain of the plurality of nacelle panels are movable independently of the remaining nacelle panels.

10. An aft engine for an aircraft comprising a fuselage, the aft engine defining an axial centerline and comprising:
   an outer nacelle extending around the axial centerline and defining an inlet; and
   a deployable assembly attached to the outer nacelle and movable between a stowed position and an engaged position, the deployable assembly altering an airflow towards the aft engine or into the aft engine through the inlet defined by the outer nacelle when in the engaged position,
   wherein the aft engine defines a circumferential direction, and wherein the deployable assembly comprises a plurality of nacelle panels spaced along the circumferential direction, and
   wherein the plurality of nacelle panels are movable along the axial centerline to a position at least partially forward of the inlet defined by the outer nacelle when in the engaged position, and wherein the plurality of nacelle panels are movable along the axial centerline to a position aft of the inlet defined by the outer nacelle when in the stowed position.

11. The aft engine of claim 10, wherein the plurality of nacelle panels each include a hinged portion at a forward end movable inward towards the axial centerline of the propulsor or outward away from the axial centerline of the propulsor.

12. The aft engine of claim 10, wherein the engaged position is a closed position, wherein the deployable assembly blocks an airflow into the inlet defined by the outer nacelle when in the closed position.

* * * * *